Feb. 2, 1954
L. PRICE
2,667,695
ADJUSTABLE TIGHT LINE HOLDER
Filed Feb. 21, 1952
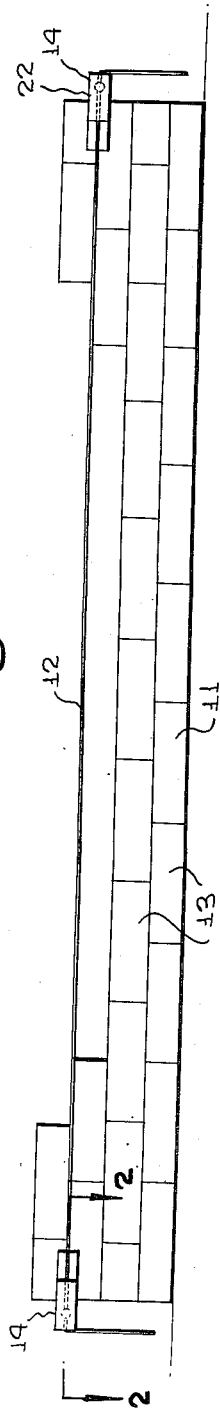
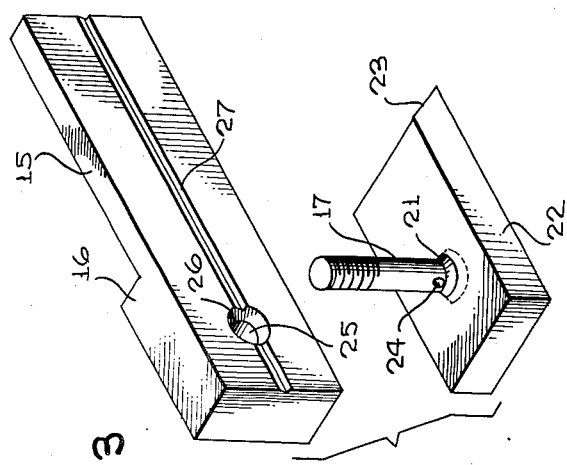
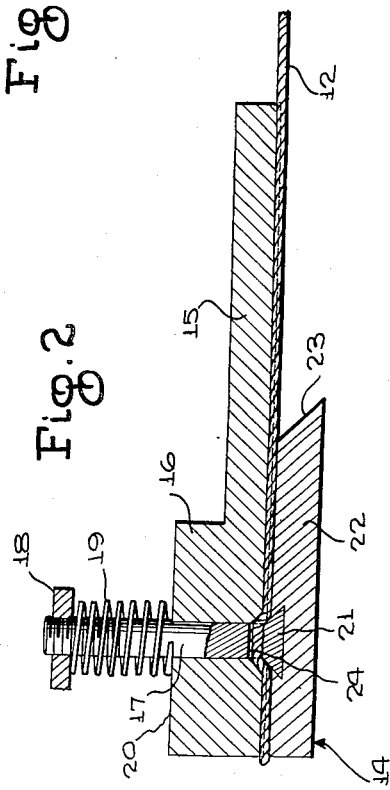
INVENTOR.
LAWRENCE PRICE
BY
McMorrow, Berman & Davidson
ATTORNEYS Patented Feb. 2, 1954

2,667,695

UNITED STATES PATENT OFFICE 2,667,695

ADJUSTABLE TIGHT LINE HOLDER

Lawrence Price, Carlton, Pa.

Application February 21, 1952, Serial No. 272,869

1 Claim. (Cl. 33—85)

This invention relates to masons' implements, and more particularly to an improved mason's guide line holder.

The main object of the invention is to provide a novel and improved mason's guide line holder which is simple in construction, which is easy to install on a wall being erected, and which securely holds and locks the guide line with which it is employed.

A further object of the invention is to provide an improved mason's guide line holder which is inexpensive to manufacture, which is sturdy in construction, and which does not require that any portion thereof be driven into the wall being constructed, and which therefore provides a considerable saving in time in setting up the guide line.

Further objects and advantages of the invention will become apparent from the following description and claim, and from the accompanying drawings, wherein:

Figure 1 is an elevational view of a portion of a wall under construction on which is mounted a guide line supported by improved guide line holders constructed in accordance with the present invention.

Figure 2 is an enlarged cross sectional view taken on the line 2—2 of Figure 1.

Figure 3 is an enlarged perspective detail view showing the main components of the guide line holder of Figures 1 and 2 in separated positions.

Referring to the drawings, 11 designates a masonry wall under construction and 12 designates a guide line which is employed to establish a reference line for the laying of the masonry units 13 in a straight horizontal line during the course of the construction of the wall. For this purpose, the line is held in horizontal position by employing a pair of guide line holders 14, 14, engaged with the end corners of the masonry wall, as shown in Figure 1, and serving to secure the opposite ends of the guide line 12.

Referring to Figures 2 and 3, each guide line holder 14 comprises an elongated main block member 15 of generally rectangular shape formed at one end with a transverse shouldered portion 16. Designated at 17 is a bolt member extending slidably through the shouldered portion 16 normal to the plane of the block member 15 and having a nut 18 threadedly engaged thereon. Designated at 19 is a coil spring surrounding the shank of the bolt member 17 and bearing between the nut 18 and the inside surface 20 of the shoulder 16. The opposite end of the bolt member 17 is formed with a conical head 21 which is rigidly secured in a plate member 22 disposed parallel to the block member 15, a portion of the conical head 21 being exposed, as shown in Figure 3. The plate member 22 is rectangular in shape and is formed at one end with the beveled edge 23, said beveled edge being convergent toward the left end of the block member 15, as viewed in Figure 2. The pin member 17 is formed adjacent the beveled head 21 with a transverse bore 24 and the bore 25 in the block member which receives bolt 17 is countersunk at 26 so that the portion of the shank of bolt 17 in which bore 24 is formed may be at times received in the countersunk recess 26. The front surface of the block member 15 is formed with a V-shaped longitudinal, relatively shallow groove 27 adapted to partially receive the guide line 12, said groove 27 being aligned with the recess 26, as shown in Figure 3.

In setting up the guide line 12, one end of the guide line 12 is first inserted through the bore 24 of one of the bolt members 17, holding the bolt member in an outwardly extended position against the force exerted by the spring 19 associated therewith. After the line has been inserted through said bore 24 and pulled sufficiently so that a substantial portion thereof is included between the block 15 and the plate member 22, the plate member 22 is released, allowing the spring 19 to expand and drawing the plate member 22 against the block 15. The guide line 12 is seated in the groove 27 and is compressed tightly against block 15 by the plate member 22. At the same time the portion of the guide line in the bore 24 is drawn inwardly into the recess 26, bending the guide line, as shown in Figure 2, and locking the guide line relative to block 15. The guide line holder 14 at the opposite end of the guide line is similarly engaged with the line in opposing relationship to the first guide line holder and the guide line holders are positioned against the opposite end corners of the wall under construction, the guide line being drawn tight with one or both of the clamping plate members 22 in outwardly held positions until the desired degree of tension is obtained in the guide line, at which time the plate members 22 are released, locking the guide line in taut position with the holders 14, 14 frictionally engaged against the end corners of the wall.

It will be understood that the setting up of the guide line, as described above, is accomplished by two persons, one holding each of the holders 14. The adjustment of the tightness of the guide line may be accomplished by one of the persons, since it is only necessary to draw the guide line through one of the holders to tighten the line. The shoulders 16 are engaged against the opposite end corners of the wall 11 while the remainder of the block elements associated therewith extend along the wall, the line 12 being supported parallel to the wall and spaced outwardly by the thickness of the main portion of the block members 15.

To release the guide line 12 it is merely necessary to pull outwardly on one of the plate members 22, whereby the clamping action thereof on the guide line is released, allowing the line to be loosened and allowing the holders to be removed.

While a specific embodiment of an improved mason's guide line holder has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A guide line holder comprising a base block having a groove extending throughout the length of one side face thereof, a stop carried by the block and projecting outwardly from the side face thereof remote from the groove, said block having an opening extending transversely therethrough and intersecting the groove, a pin extending through the opening in the block for movement transversely relative to the block, a clamp plate carried by the pin for movement therewith adjacent the grooved face of the block, and yielding means carried by the pin and bearing on the block for yieldingly urging the clamp plate into clamping engagement with a guide line lying in the groove.

LAWRENCE PRICE.

References Cited in the file of this patent

UNITED STATES PATENTS

| Number | Name | Date |
|---|---|---|
| 21,398 | Rogers | Aug. 31, 1858 |
| 946,964 | Hall | Jan. 18, 1910 |
| 1,379,093 | Freeberg | May 24, 1921 |
| 1,387,358 | Costello | Aug. 9, 1921 |
| 1,616,881 | Wharton | Feb. 8, 1927 |